No. 618,007. Patented Jan. 17, 1899.
T. HILL.
DUMPING VEHICLE.
(Application filed Feb. 26, 1898.)
(No Model.)
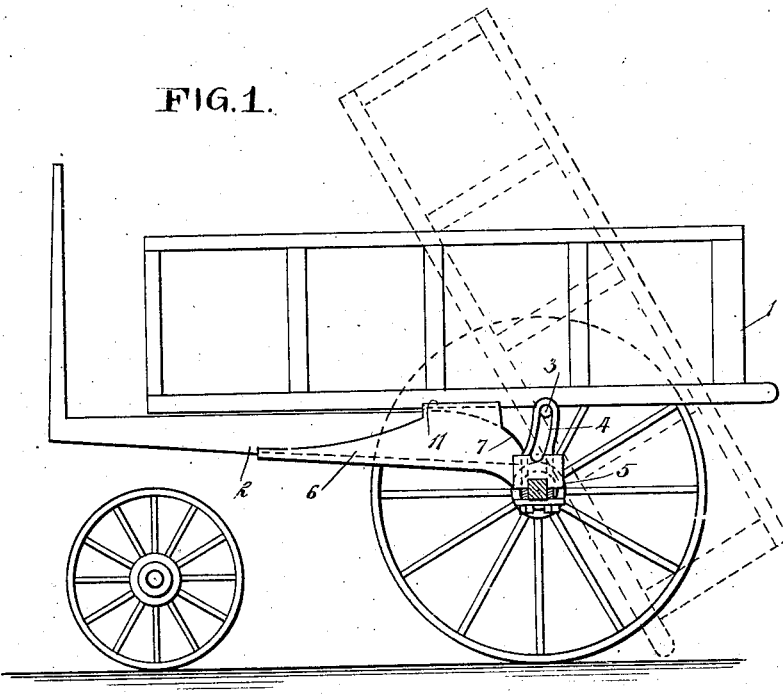
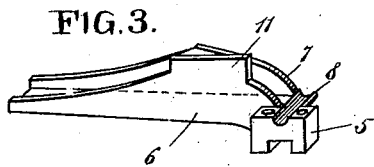
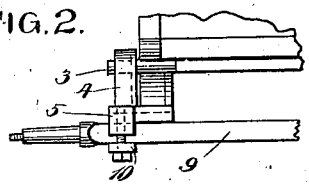
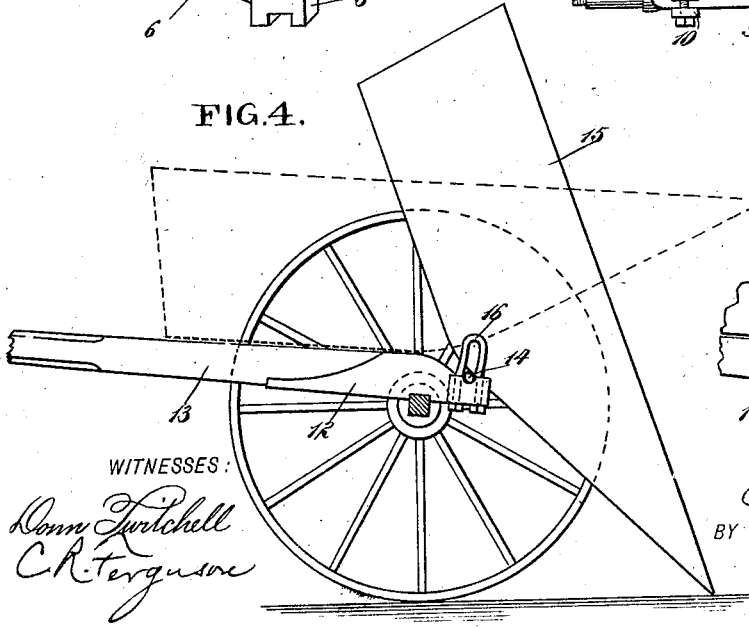
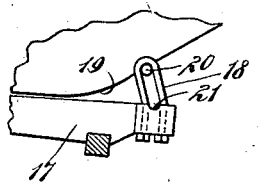
WITNESSES:
Donn Twitchell
C. R. Ferguson
INVENTOR
T. Hill
BY
ATTORNEYS.

UNITED STATES PATENT OFFICE.

THOMAS HILL, OF JERSEY CITY, NEW JERSEY.

DUMPING-VEHICLE.

SPECIFICATION forming part of Letters Patent No. 618,007, dated January 17, 1899.

Application filed February 26, 1898. Serial No. 671,786. (No model.)

*To all whom it may concern:*

Be it known that I, THOMAS HILL, of Jersey City, in the county of Hudson and State of New Jersey, have invented a new and Improved Dumping-Vehicle, of which the following is a full, clear, and exact description.

This invention relates to improvements in dumping-vehicles or in vehicles having a fulcrumed body; and the object is to provide such a vehicle in which the link connections usually employed are dispensed with, thus simplifying and materially reducing the cost of construction.

I will describe a dumping-vehicle embodying my invention, and then point out the novel features in the appended claims.

Reference is to be had to the accompanying drawings, forming a part of this specification, in which similar characters of reference indicate corresponding parts in all the views.

Figure 1 is a side elevation and partial section showing a four-wheeled vehicle embodying my invention. Fig. 2 is a fragmentary rear elevation. Fig. 3 is a perspective view of a fulcrum-boxing employed. Fig. 4 is a side elevation and partial section of a cart or two-wheeled vehicle having my invention applied thereto, and Fig. 5 shows a modification.

Referring first to the example of my improvement shown in Fig. 1, 1 designates the body of a wagon normally supported on the side sills 2 and having a fulcrum-point rearward of the support. The fulcrum of the body comprises trunnions 3, extended laterally from the body into guide-loops 4, extended upward from blocks 5, formed at the rear end of metal boxes 6, attached to the rear ends of the sills 2. The upper rear ends of the boxes 6 are curved downward, as at 7, and the tops of the sills are correspondingly curved, thus providing a bed on which the body may move while dumping. Each boxing 6 has at the lower end of its curved portion and in line with the guides 4 a transverse channel 8. These channels are designed to receive the trunnions and form the fulcrum-bearings therefor. In this example of my improvement the guides 4 not only serve to direct the trunnions to their bearings, but also serve to secure the boxings to the rear axle 9—that is, the guides have threaded portions which pass through holes in the blocks 5 and through plates 10, bearing against the under side of the axle and secured by nuts. To receive any lateral thrusts of the vehicle-body, the outer sides of the boxings are extended upward, as at 11, to engage against the sides of the body.

In the example of my improvement shown in Fig. 4 and which represents a two-wheeled cart the boxings 12 are somewhat similar to the boxings first described, but they are secured directly to the cart-shafts 13. The upper sides at the rear end are curved, and rearward of these curved bearings are the fulcrum-bearings for the trunnions 14, extended from the slanting body portion of the body 15. The trunnions 14 project into guides 16, somewhat similar to the guides 4, but in this instance do not serve to secure the boxings to the axle.

In Fig. 5 I have shown a boxing 17 as straight on its upper side and a guide 18 at the end thereof, which is inclined slightly forward. The rounded portion 19 of the body may move on said straight upper sides of the boxings to engage the trunnions 20 in the fulcrum-bearings 21.

It will be observed in my improvement that I employ no special primary bearing for the dumping-body, as has been previously done— that is, in my construction the body does not work from one special bearing to another and rest on both at the same time until a second action in tilting is made in order to dump the load. The body in changing its fulcrum on the smooth curved surfaces causes the weight to increase rearward, so that its descent is continuous until the load is dumped. Therefore there is but one dumping action. In other words, there is no sliding motion of the body, as in patents granted to me and numbered, respectively, 561,389, June 2, 1896, and 583,373, May 2, 1897. This is due to the fact that the guides are extended at an upward angle relatively to the metal boxes.

Having thus described my invention, I claim as new, and desire to secure by Letters Patent—

1. In a dumping-vehicle, a support curved downward and rearward on the upper side, guides at the ends of the support and extended at an upward angle relatively thereto, a dumping-body, and trunnions extended from the body into the guides, substantially as specified.

2. In a dumping-vehicle, the combination with a body and the running-gear frame, of metal boxings on said frame, the said boxings being curved downward and rearward at the upper side, laterally-extended blocks at the ends of the curved portions and having fulcrum-bearings in the upper side, guides extended at an upward angle relatively to the blocks, and trunnions extended from the body into the guides, substantially as specified.

3. In a dumping-vehicle, the combination with a body and the sills or shafts, of metal boxings secured to the sills or shafts and curved downward on the top, a fulcrum-bearing being formed at the rear end of the curved portion, rigid guides extended at an upward angle relatively to the boxings in line with the fulcrum-bearings, and trunnions extended from the body into said guides and adapted to engage in the fulcrum-bearings, substantially as specified.

4. For use in a dumping-vehicle, a metal boxing having upwardly-turned sides curved downward on the top, at the rear end, the outer side being provided with an extension to receive side thrusts of a vehicle-body, a block extended laterally from the rear end of the boxing and having a fulcrum-bearing in the upper side, and a guide extended at an upward angle relatively to the block, substantially as specified.

5. In a dumping-vehicle, a frame having downwardly-curved rear ends, a body mounted to move on said curved ends, trunnions on the body, and guides into which the trunnions extend, the said guides being at the extreme dumping-point and at an upward angle relatively to the curved ends, for the purpose of regulating the dumping of the body, substantially as specified.

6. In a dumping-vehicle, the combination with a body and a running-gear, of metal boxings on the gear and on which the body may rock, guide-loops at the ends of the boxings and serving to secure the boxings to the vehicle-axle, and trunnions extended from the body into the guide-loops, substantially as specified.

THOMAS HILL.

Witnesses:
 JNO. M. RITTER,
 C. R. FERGUSON.